United States Patent

Borg et al.

[11] 3,885,678
[45] May 27, 1975

[54] MATERIAL HANDLING APPARATUS

[75] Inventors: Sven Christer Borg, Handen; Christer Ragnar Hesson, Johanneshov; Erik Henning Nilsson, Trangsund, all of Sweden

[73] Assignee: Aktiebolaget Electrolux, Stockholm, Sweden

[22] Filed: Oct. 15, 1973

[21] Appl. No.: 406,593

[30] Foreign Application Priority Data
Oct. 18, 1972 Sweden.............................. 13470/72

[52] U.S. Cl............ 214/1 BB; 214/1 BC; 214/1 BT
[51] Int. Cl................................................ B66c 1/42
[58] Field of Search ... 214/1 BB, 1 BC, 1 BS, 1 BH, 214/1 BT, 1 B

[56] References Cited
UNITED STATES PATENTS

| 3,124,260 | 3/1964 | Tidball | 214/1 BT |
| 3,648,854 | 3/1972 | Potter | 214/1 BB |
| 3,648,855 | 3/1972 | Potter | 214/1 BB |
| 3,682,327 | 8/1972 | Winne | 214/1 BC |

*Primary Examiner*—M. Henson Wood, Jr.
*Assistant Examiner*—Reinhard J. Eisenzopf

[57] ABSTRACT

Material handling apparatus for transferring work pieces between different stations in the form of a compact assembly having one unit capable of movement in a plane parallel to its longitudinal axis and additional units for transferring the work pieces from one location to another and also being capable of both vertical and rotary movement whereby the articles can be moved at least in a horizontal plane. The apparatus is provided with adjustable, exchangeable holders for the additional units.

12 Claims, 5 Drawing Figures

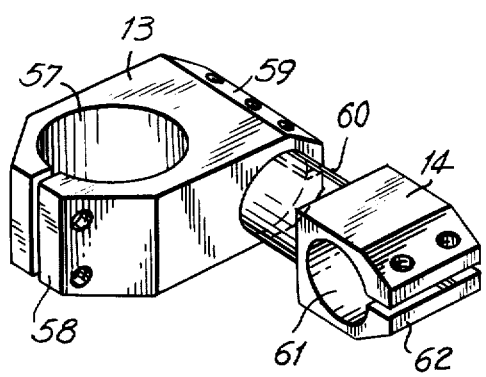
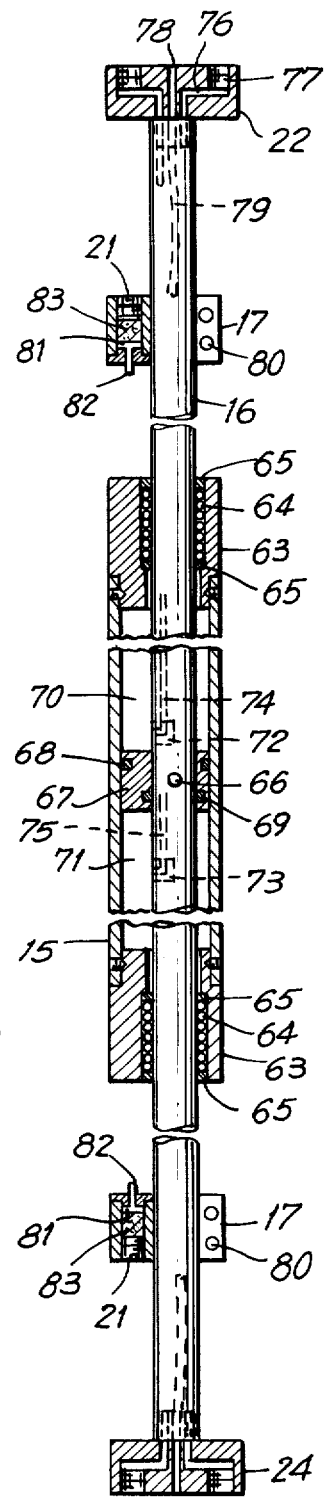

{ 3,885,678 }

MATERIAL HANDLING APPARATUS

BACKGROUND OF THE INVENTION

The known material handling devices, which are referred to generally as robots, are constructed most often as heavy, complicated and expensive assemblies that cannot be easily altered to modify the devices for different or additional operations.

It is an object of the present invention to provide a material handling apparatus known as a robot which has a simpler and less expensive construction than that of the prior known constructions and which is more flexible in operation than previously known devices of the same type.

A further object of the present invention is to provide a material handling apparatus that has the capability of increasing or decreasing the number of transferring units as desired.

An object of the present invention is to provide adjustable stop elements.

Another object of the present invention is to provide a material handling apparatus with additional transferring units that are removably held by exchangeable holders provided with adjustment devices for mounting the unit in the selected position relative to the other units of the apparatus.

An object of the present invention is to provide a compact, relatively inexpensive, material handling apparatus which is reliably effective for the purposes intended.

The invention will now be described with reference to the accompanying drawings, in which:

FIG. 4 is a perspective view of a holder for a drive cylinder provided with adjustment devices; and FIG. 5 is a cross-sectional view of a longitudinally moving drive unit that is adapted to be removably held by the holder shown in FIG. 4.

DESCRIPTION OF THE PREFERRED EMBODIMENT

Figure 1:
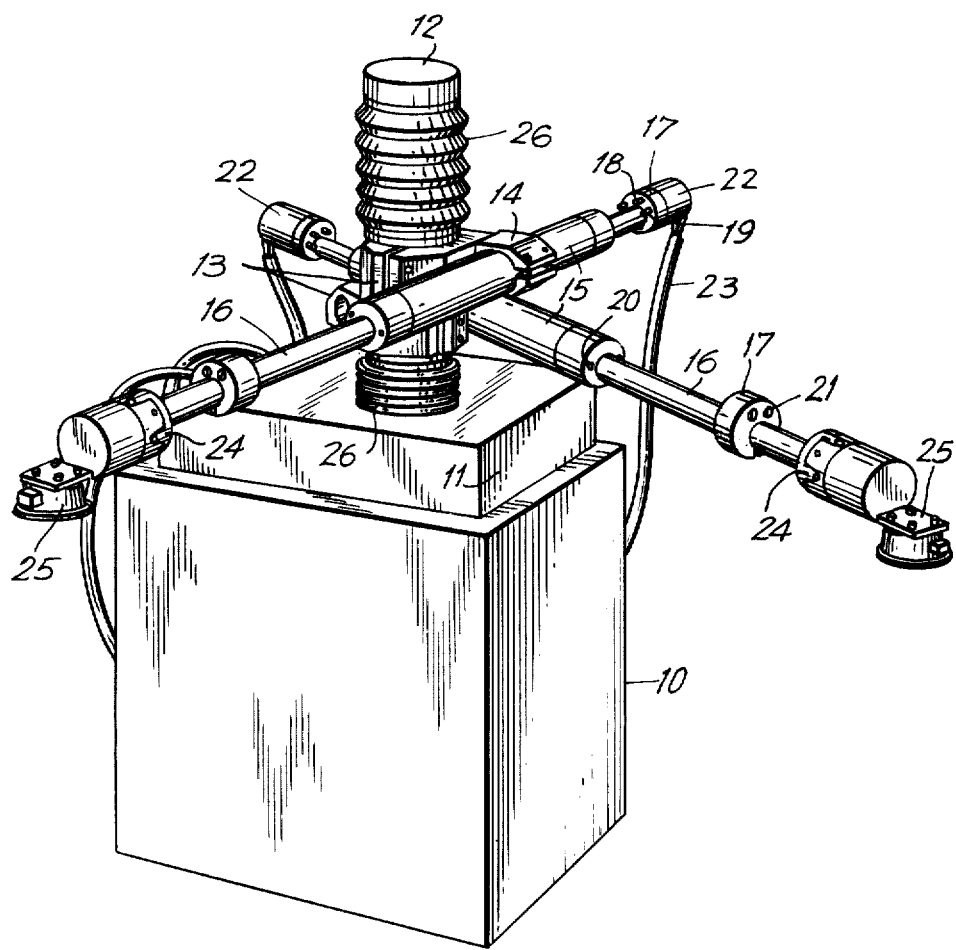
FIG. 1 is a perspective view of a material handling apparatus showing two longitudinally moving units adjustably mounted thereon and constructed in accordance with the teachings of the present invention.

Referring to FIG. 1, the base 10 mounts the control system for the material handling apparatus constructed in accordance with the teachings of the present invention. A hood 11 is supported on the top of the base 10 and has a rotary unit mounted thereon which is connected to vertical movement unit 12. The unit 12 is constructed to receive a selected number of holders 13 which are placed on various levels thereon.

As seen in FIG. 4, each holder 13 is provided with an adjustment device 14 that can be moved to various positions at different distances from the vertical movement unit 12 and furthermore, can be rotated into various selected angles relative to the horizontal plane. Furthermore, each of the adjustment devices 14 on the holders 13 clamp a drive cylinder 15, and the clamping location can be selected anywhere along the drive cylinder 15. It should be noted that the holder 13 and the adjustment device 14 permit each drive cylinder 15 to be positioned vertically, laterally, longitudinally, and at a selected angle relative to the horizontal plane.

As seen in FIGS. 1 and 5, each drive cylinder 15 is provided with an arm 16 that can move longitudinally and the limit of this movement is determined by movable stops 17 that can be locked on the arm 16. FIG. 1 shows the stops 17 having dampers 18 and guide pins 19 which are conical in shape and extend parallel to the longitudinal axis of the drive cylinder 15. The pins 19 are adapted to co-act with holes 20 in the drive cylinders 15 which are also conical in shape. Each damper 18 is adjustable by means of screws 21.

At the rear end of each arm 16 connecting means 22 are located by which, for example, electrical wires (not shown) and external compressed air conduits 23 are connected to the arm. The wires and conduits are sufficiently flexible so that they are able to follow the movement of the arm 16. A coupling member 24 is mounted at the forward end of each arm to which any selected type of gripper device may be attached. As seen in FIG. 1, magnetic gripper devices 25 are shown attached to the coupling member 24. However, it is within the scope of the present invention to provide other suitable types of grippers, such as grippers operated by compressed air.

The two arms 16 shown in FIG. 1 can be elevated, lowered, or rotated by means of the vertical movement unit 12 or the rotary unit of the apparatus, respectively. The inner mechanism of the vertical movement unit 12 is encased and protected by a bellows 26. The bellows 26, as seen in FIG. 1, may be fabricated of rubber, leather, cloth, or any other suitable material.

The material handling apparatus as illustrated in FIG. 1 may be used, for example, to transfer an unprocessed work piece to a processing place simultaneously as the processed work piece is being transferred to another work or assembling station.

Figure 2:
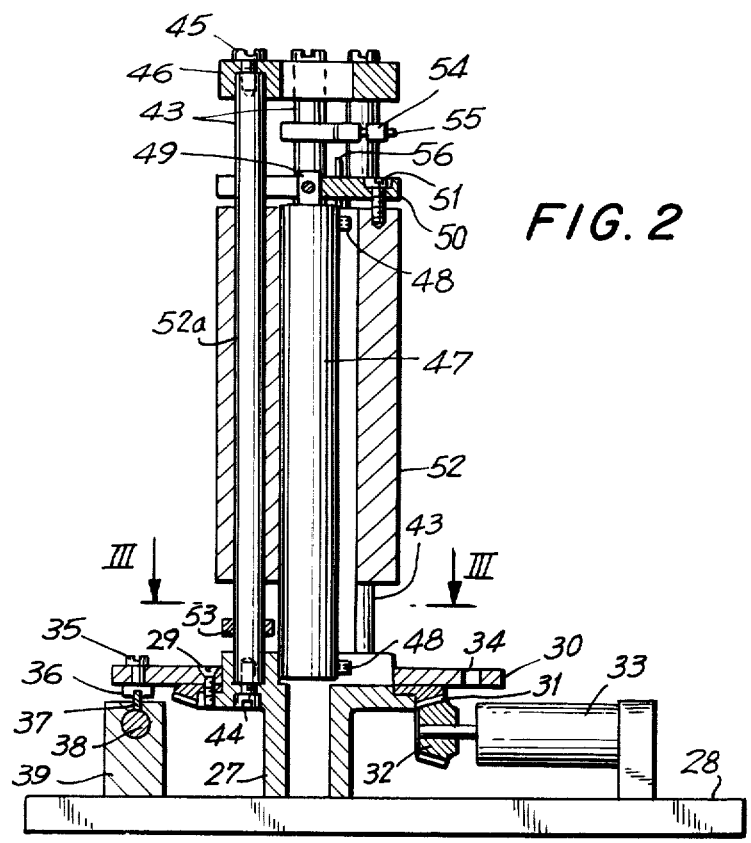
FIG. 2 is a cross-sectional view showing a unit of the present apparatus which is capable of both vertical and rotary movement, and taken along the lines II—II of FIG. 3.
Figure 3:
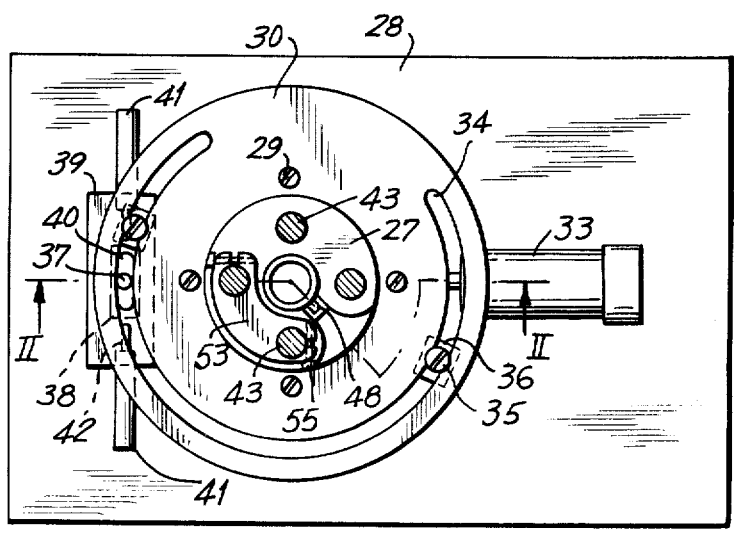
FIG. 3 is a cross-sectional view of the unit illustrated in FIG. 2 and taken along the lines III—III of FIG. 2.

Referring to FIGS. 2 and 3, a rotary unit as well as a vertical movement unit 12 is shown assembled to form a single compact material handling apparatus. It will be observed that for the sake of clarity the above-described hood 11, bellows 26, and holders 13 are removed from the drawings. The rotary unit is shown with a hub 27 that is rotatably mounted on a support 28 by a bearing means (not shown). As seen in FIG. 2, the hub 27 is connected to a plate 30 and an attached gear ring 31 by means of screws 29. The gear ring co-acts with a pinion 32 driven by means of a motor, such as the air motor 33, attached to the support 28. Thus, the rotary unit can be turned to a selected angular position by means of the motor 33, pinion 32, and gear ring 31.

The plate 30, as seen in FIG. 3, is provided with a groove 34 in which stop screws 35 can be locked in selected positions. Each stop screw 35 co-acts with a shoulder 36 which in the end positions of the rotary unit strikes against a stop pin 37. The pin 37 is connected to a piston 38 operating in a groove 40 in the damper casing 39. Two dampers 41 are shown disposed on opposite ends of the damper casing and each is provided with a damper rod 42. The latter is acted upon by the piston 38 when the rotary unit has reached one of its angular end positions. When the damping movement of the dampers 41 are completed, the piston 38 or the shoulder 36 continues in the same line of movement and finally strikes a stationary stop (not shown).

As seen in FIG. 3, the vertical movement unit 12 has four slide shafts 43, the bottom ends of which are secured to the hubs 27 by screws 44 and the top ends of which are secured by means of screws 45 to a yoke 46. A lifting cylinder in the form of a compressed air cylinder 47 is secured to the hub 27. Compressed air may be supplied to the cylinder 47 by means of nipples 48 and air conduits (not shown). The cylinder 47 is provided with a lifting rod 49 connected to a bridge 50 which, in turn, is attached to a vertical cylinder 52 by means of screws 51. As is seen in FIG. 2, the cylinder 52 is provided with elongated holes 52a which accommodate the slide shafts 43, whereby each of the cylinders 52 can slide vertically along the slide shafts 43. The upward and downward movement of the vertical cylinder 52 is defined by the lower stop member 53 and the upper stop member 54. The stop members are movable along the slide shafts 43 and each stop member is operable on two slide shafts, and may be locked in any selected position along the slide shafts by means of screws 55.

It should be apparent that the movements of the vertical cylinders 52 are absorbed by dampers located in the end positions. Referring to FIG. 2, the damping rod 56 is shown associated with one of these dampers. In the elevated position of the vertical cylinder 52, the damping rod 56 engages the adjustable stop member 54. After the damping movement of damping rod 56 has concluded, the bridge 50 continues moving until it strikes against the stop member 54 or any other suitable stationary stop (not shown). A corresponding damping rod is also arranged at the bottom of the vertical cylinder 52.

It should be noted that the rotary unit and the vertical movement unit form a common structure. The above-mentioned holders 13 which are designed to be mounted on the vertical cylinder 52 together with the arms 16 can simultaneously impart a rotary movement as well as a movement in a vertical direction. The vertical cylinders 52 and the slide shafts 43 can be easily adapted to the selected number of holders 13 and arms 16.

FIG. 4 illustrates in detail the construction of a holder 13 with an adjustment device 14 that can be positioned and locked in place. The holder 13 is provided with a cylindrical hole 57 designed to be mounted on a vertical cylinder 52 and to co-act therewith. By means of the clamping portion 58, the holder 13 can be locked to the vertical cylinder 52. The holder 13 is further provided with an additional clamping member 59 by which the short shaft 60 associated with the adjustment device 14 can be locked in a selected position. The adjustment device 14 is provided with a hole 61 and a clamping part 62 which operates to hold the drive cylinder 15 in said hole. The drive cylinder 15 can be moved to any position relative to the adjustment device 14 and may be locked in the selected position. Accordingly, the adjustment device 14 and the drive cylinder 15 can be arranged at the desired angle to the horizontal plane by means of the clamping member 59.

Referring to FIG. 5, a drive cylinder 15 is shown having an arm 16, stops 17 arranged on the arm, connecting means 22 and coupling member 24 at opposite ends of the arm 16. The latter extends through two end elements 63 to which the drive cylinder 15 is attached. The end elements 63 have roller bearings 64 aligned in rows. Gaskets 65 are inserted at the outer and inner ends of each of the roller bearings. A piston 67 is secured to the arm 16 by means of a pin bolt 66. The piston 67 is sealed by gasket 68 against the cylinder 15 while the gasket 69 seals the piston 67 against the arm 16.

The arm 16 is secured to the piston 67 and the roller bearings 64 are located within the end elements 63 eccentrically with respect to the longitudinal axis of the drive cylinder 15. Because of the above-described construction, the arm 16 will be held in a non-rotating position relative to the piston 67 and the drive cylinder 15, and also with respect to the adjustment device 14. It should be pointed out that in the prior art constructions, additional guide shafts were necessary in order to obtain an arm that is non-rotatable; however, since the present invention eliminates this extra structure, both the holder 13 and the adjustment device 14 may be a simple construction which nevertheless achieves the desired result. Furthermore, an accurate adjustement of the rotational position of the arm 16 is performed by the eccentric mounting of the arm 16 in the drive cylinder 15. The accuracy of the mounting position of the arm 16 is further increased by the co-action between the conical guide pins 19 and the conical guide holes 20.

Referring again to FIG. 5, it will be noted that on either side of the double acting piston 67 are chambers 70 and 71. Compressed air is supplied to chamber 70 through nipple 72 and air conduit 74, while compressed air is supplied chamber 71 through nipple 73 and air conduit 75. The air conduits are connected to corresponding channels 76 in the connecting means 22 which has a plurality of threaded holes 77 for air pressure nipples. Compressed air is supplied through the conduits 23 (FIG. 1) and the nipples in the threaded holes 77 to the chambers 70 and 71 and to the coupling member 24 to be finally transmitted to a gripper device (not shown). An electrical conductor 79 can be led through another channel 78 and through the arm 16 to the coupling member 24 and further to a magnetic device 25, as seen in FIG. 1. The connecting means 22 and the coupling member 24 can be different or identical, and provided with the necessary attachment means for gripper devices, conduits, etc.

It should be observed that the stops 17 are movable along the arm 16 and can be locked in any desired position on the arm by means of a clamping device 80. As described hereinabove, each stop 17 is provided with a damping device. The damping device comprises a cylindrical space, one end of which is bounded by a damping piston 81 having a damping rod 82 and the other end is bounded by an adjustment screw 21. The cylindrical space between the damping piston and the adjustment screw is filled with a damping material 83, preferably a foamed plastic material having open pores. This plastic material enables one to achieve a reproducible adjustment of the degree of damping by means of the adjustment screw 21.

It is within the scope of the present invention to provide stop devices that activate signal members in the form of micro-switches which send a signal to a control system when one movement of the material handling apparatus has been finished and the next movement is to be commenced.

What is claimed is:

1. A material handling apparatus for the transfer of work pieces from one predetermined position to another predetermined position comprising at least one unit for movement along its longitudinal axis and an additional assembly having a unit for vertical movement and a unit for rotary movement, the latter being adapted to transfer said work pieces in a substantially horizontal plane, said additional assembly being provided with at least one exchangeable and adjustable holder for setting the corresponding longitudinally moving unit in the selected position relative to said additional assembly, said holder having an adjustment device provided with means to lock said longitudinally moving unit at an adjustable distance from the additional assembly and at an adjustable angle to said horizontal plane.

2. A material handling apparatus as claimed in claim 1 wherein said unit for vertical movement and said unit for rotary movement form a common structure to which exchangeable holders may be clamped in selected positions.

3. A material handling apparatus as claimed in claim 1 wherein each unit for movement along its longitudinal axis comprises an arm, and a drive cylinder operatively connected to said arm for moving the latter in a longitudinal direction, and each adjustable holder being provided with a clamping part to lock said drive cylinder, said clamping part being positioned at a selected location along said drive cylinder.

4. A material handling apparatus as claimed in claim 3 wherein said arm is tubular and is provided with internal conduits operatively connected to said drive cylinder whereby an operating medium is supplied to said drive cylinder through said internal conduits.

5. A material handling apparatus as claimed in claim 3 wherein said operating medium is compressed air.

6. A material handling apparatus as claimed in claim 3 wherein each clamping part is movably connected to said adjustable holder.

7. A material handling apparatus as claimed in claim 3 further comprising a reciprocable piston in said drive cylinder and wherein said arm is mounted eccentrically in the ends of said drive cylinder and is eccentrically connected to said piston, said arm being non-rotatable relative to said drive cylinder and said clamping part.

8. A material handling apparatus as claimed in claim 7 further comprising conical guide pins mounted on an end of said arm, and correspondingly shaped holes in an end of said cylinder, said pins and holes mating in a predetermined position of said arm relative to said drive cylinder.

9. A material handling apparatus as claimed in claim 3 further comprising adjustable stops mounted on said arms to determine the extent of movement of said arm along its longitudinal axis.

10. A material handling apparatus as claimed in claim 9, wherein each of said stops includes a damping device provided with a damping material, and adjustment means whereby reproducible adjustment of the degree of damping may be achieved.

11. A material handling apparatus as claimed in claim 3 further comprising a magnetic gripper device operatively connected to said arm and wherein said operating medium is an electric conductor connected to said magnetic gripper device whereby electric current is applied thereto.

12. A material handling apparatus for the transfer of work pieces from one predetermined position to another predetermined position comprising at least one unit for movement along its longitudinal axis and an additional assembly having a unit for vertical movement and a unit for rotary movement, the latter being adapted to transfer said work pieces in a substantially horizontal plane, said additional assembly being provided with a plurality of exchangeable and adjustable holders removably secured on superposed levels on said vertical movement unit, each of said holders being adapted for setting the corresponding longitudinally moving unit in a selected position relative to said additional assembly.

* * * * *